United States Patent
Wimmer et al.

(10) Patent No.: US 11,851,194 B2
(45) Date of Patent: Dec. 26, 2023

(54) RETENTION SYSTEMS AND METHODS FOR EJECTION SEATS

(71) Applicant: AMI Industries, Inc., Colorado Springs, CO (US)

(72) Inventors: Dustin Wimmer, Colorado Springs, CO (US); Glen Shaw, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 105 days.

(21) Appl. No.: 17/462,420

(22) Filed: Aug. 31, 2021

(65) Prior Publication Data

US 2023/0063264 A1    Mar. 2, 2023

(51) Int. Cl.
*B64D 25/10* (2006.01)
*B64D 25/06* (2006.01)

(52) U.S. Cl.
CPC ............. *B64D 25/10* (2013.01); *B64D 25/06* (2013.01)

(58) Field of Classification Search
CPC ........ B64D 25/02; B64D 25/06; B64D 25/10; B60R 22/00; B60R 2021/0041
See application file for complete search history.

(56) References Cited

U.S. PATENT DOCUMENTS

| | | | |
|---|---|---|---|
| 2,940,701 A * | 6/1960 | Beem | B64D 10/00 |
| | | | 244/122 AG |
| 3,074,669 A * | 1/1963 | Bohlin | B64D 25/02 |
| | | | 244/122 AG |
| 3,202,384 A * | 8/1965 | Martin | B64D 25/02 |
| | | | 244/122 AG |
| 3,329,464 A * | 7/1967 | Barwood | B64D 25/02 |
| | | | 244/122 B |
| 3,424,408 A | 1/1969 | Martin | |
| 3,957,231 A * | 5/1976 | Miller | B64D 25/02 |
| | | | 244/122 AG |
| 4,179,086 A * | 12/1979 | Yamada | B64D 25/02 |
| | | | 244/122 AG |
| 4,247,064 A | 1/1981 | Schulman et al. | |
| 4,462,563 A | 7/1984 | Specker et al. | |
| H115 H | 8/1986 | Lorch | |
| 5,072,897 A | 12/1991 | Aronne | |
| 6,292,945 B1 * | 9/2001 | Lewis | A41D 13/0007 |
| | | | 244/122 AG |
| 2008/0116681 A1 * | 5/2008 | Van Rooyen | B60R 22/322 |
| | | | 280/801.1 |

FOREIGN PATENT DOCUMENTS

GB    1456007    11/1976

OTHER PUBLICATIONS

European Patent Office, European Search Report dated Jan. 2, 2023 in Application No. 22187321.9.

* cited by examiner

*Primary Examiner* — Joshua J Michener
*Assistant Examiner* — Ka Chun Leung
(74) *Attorney, Agent, or Firm* — SNELL & WILMER L.L.P.

(57) ABSTRACT

A method may include receiving, via a processor, an ejection initiation signal indicating an ejection event for an ejection seat of an aircraft has been initiated; commanding, via the processor, a retraction mechanism to retract a cuff assembly towards a seat back of the ejection seat in response to the ejection initiation signal; and commanding, via the processor, a guillotine to sever a cord coupled to the cuff assembly.

13 Claims, 7 Drawing Sheets

RETENTION SYSTEMS AND METHODS FOR EJECTION SEATS

FIELD

The present disclosure relates to aircraft ejection seats, and more specifically, to retention systems and methods for aircraft ejection seats.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Ejection seats may experience a high velocity windblast due to ejection seats entering a wind stream during an ejection event. Arms of occupants may be susceptible to being exposed to the high velocity wind blast during the ejection event.

SUMMARY

A retention system for an aircraft ejection system is disclosed herein. The retention system may comprise: a first cuff assembly disposed on a first side of an ejection seat; a second cuff assembly disposed on a second side of the ejection seat; a first cord extending from within the ejection seat to the first cuff assembly; a second cord extending from within the ejection seat to the second cuff assembly, the retention system configured to allow a free range of motion of the first cuff assembly and the second cuff assembly during an aircraft flight, the retention system configured to retract and lock the first cuff assembly and the second cuff assembly in response to a seat ejection being initiated.

In various embodiments, the retention system may further comprise a retraction mechanism disposed in a seat back of the ejection seat, the retraction mechanism configured to retract the first cord. The retention system may further comprise a first guillotine and a second guillotine, the first guillotine configured to sever the first cord during a seat ejection process, the second guillotine configured to sever the second cord during the seat ejection process. The retention system may further comprise a first retraction mechanism operably coupled to the first cord and a second retraction mechanism operably coupled to the second cord. The first retraction mechanism and the second retraction mechanism may each comprise a spool, the first cord wound around the spool of the first retraction mechanism, the second cord wound around the spool of the second retraction mechanism. The first retraction mechanism and the second retraction mechanism may each be without a spring. The first cuff assembly and the second cuff assembly may each comprise a cuff and a size adjuster.

A retention system for an aircraft ejection system is disclosed herein. The retention system may comprise: a cuff assembly; a retraction mechanism; a cord extending from the retraction mechanism to the cuff assembly; a guillotine configured to sever the cord; and a controller in operable communication with the guillotine, the controller configured to: receive, via a processor, an ejection initiation signal indicating an ejection event of an ejection seat has been initiated; and command, via the processor, severing of the cord after ejection of the ejection seat.

In various embodiments, the controller is in operable communication with the retraction mechanism, the controller further configured to command the retraction mechanism to retract the cord in response to the ejection event being initiated. The controller may be further configured to command the retraction mechanism to lock the cord in response to the ejection event being initiated. The cuff assembly may be disposed between being flush with a seat back and being a foot (35 cm) from the seat back in response to the retraction mechanism locking. The aircraft ejection system may comprise a catapult configured to eject the ejection seat from an aircraft. A pressure from the catapult may be configured to retract the cord via the retraction mechanism. The retention system may further comprise a second cuff assembly coupled to the cord.

A method is disclosed herein. The method may comprise: receiving, via a processor, an ejection initiation signal indicating an ejection event for an ejection seat of an aircraft has been initiated; commanding, via the processor, a retraction mechanism to retract a cuff assembly towards a seat back of the ejection seat in response to the ejection initiation signal; and commanding, via the processor, a guillotine to sever a cord coupled to the cuff assembly.

In various embodiments, the guillotine severs the cord after the ejection seat is ejected from the aircraft. The method may further comprise commanding, via the processor, a second retraction mechanism to retract a second cuff assembly towards the seat back of the ejection seat simultaneously with the cuff assembly. The cuff assembly may be coupled to a bicep and/or wrist of an occupant. The method may further comprise commanding, via the processor, locking of the retraction mechanism. The retraction mechanism may lock the cuff assembly between being flush with the seat back and being a foot (35 cm) from the seat back.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein, is a bicep and/or wrist retention system for use in ejection seats of aircraft ejection systems. The bicep and/or wrist retention system is configured to retract and/or lock a bicep and/or wrist retention apparatus during an ejection process. In this regard, the bicep and/or wrist retention system may be configured to retract a cord during the ejection process to a side of the ejection seat during the ejection process. In response to the initial ejection process being completed and the passenger beginning to descend, the cord, may be severed allowing arm movement for a respective passenger, in accordance with various embodiments. In various embodiments, the bicep and/or wrist retention system may help prevent limbs from flailing during an ejection process, resulting in a safer ejection process relative to typical ejection systems.

Figure 1:
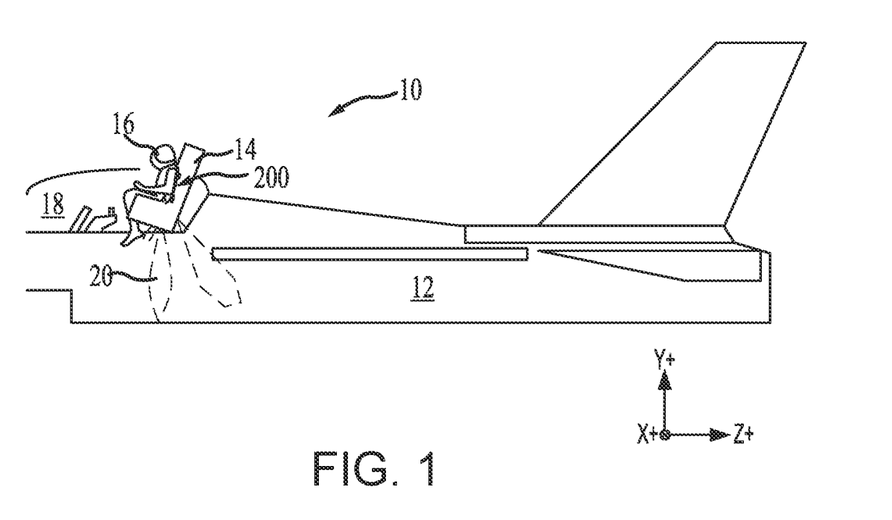
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes a bicep and/or wrist retention system 200. The bicep and/or wrist retention system 200 may be coupled to, or integral with, a respective seat back pad or a respective seat pan pad. The bicep and/or wrist retention system 200 may be sized and configured to retract an arm, or bicep and/or wrist, of an occupant 16 during the ejection process as described further herein.

Figure 2:
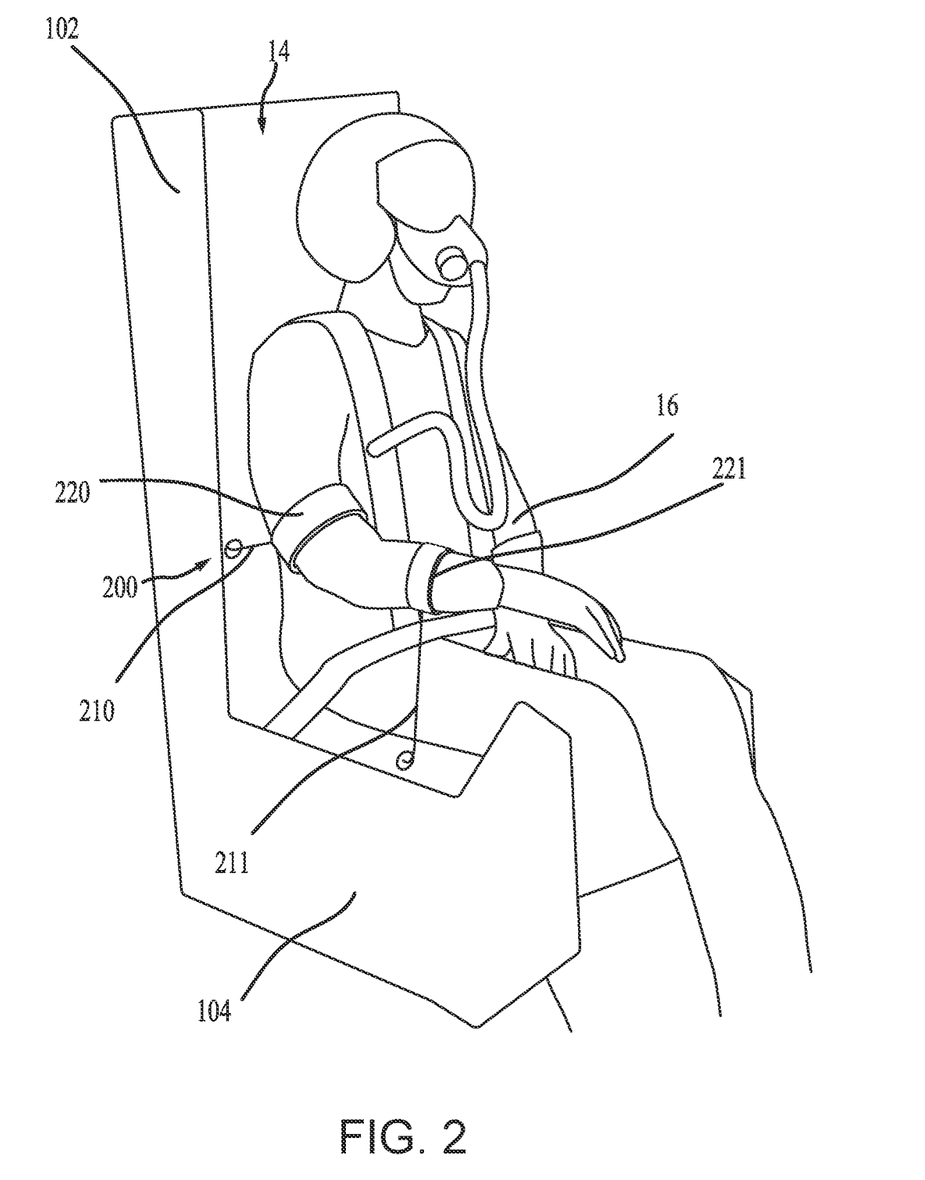
FIG. 2 illustrates an ejection seat having a bicep and/or wrist retention system, in accordance with various embodiments.

Referring now to FIG. 2, an ejection seat 14 is illustrated with a bicep and/or wrist retention system 200, in accordance with various embodiments. Ejection seat 14 includes a seat back 102 and a seat pan 104. The ejection seat 14 comprises a bicep and/or wrist retention system 200. The bicep and/or wrist retention system 200 comprises a cord 210 and a cuff assembly 220. The bicep and/or wrist retention system 200 is configured to be coupled to an occupant 16 of an aircraft 12 from FIG. 1. For example, the cuff assembly 210 comprises a size adjuster, as described further herein, the size adjuster configured to adjust a diameter of a cuff in the cuff assembly 210 to secure the cuff assembly 210 to the occupant 16.

The cord 210 of the bicep and/or wrist retention system extends from the cuff assembly 220 to a retraction mechanism as described further herein. In various embodiments, the retraction mechanism is disposed within the seat back 102. In various embodiments, the retraction mechanism may be disposed in the seat pan 104 and in a routed channel of the seat back 102. The present disclosure is not limited in this regard. In various embodiments, the retraction mechanism is configured to allow rapid movements by the occupant 16. In this regard, the occupant 16 may be allowed to move about normally when reacting during flight of the aircraft 12 of FIG. 1, in accordance with various embodiments. In various embodiments, the retraction mechanism is configured to lock in response to an ejection event as described further herein. Although illustrated as being coupled to the bicep in FIG. 2, the present disclosure is not limited in this regard. For example, coupling the cuff assembly 220 to a wrist is also within the scope of this disclosure. In various embodiments, multiple cuffs may be utilized to couple to a wrist and a bicep of an arm of an occupant 16. For example, the bicep and/or wrist retention system 200 may further comprise a second cord 211 in accordance with cord 210 and a second cuff assembly 221 in accordance with cuff assembly 220. The second cuff assembly 221 may be configured to couple to a wrist of an occupant 16 in accordance with various embodiments.

Figure 3:
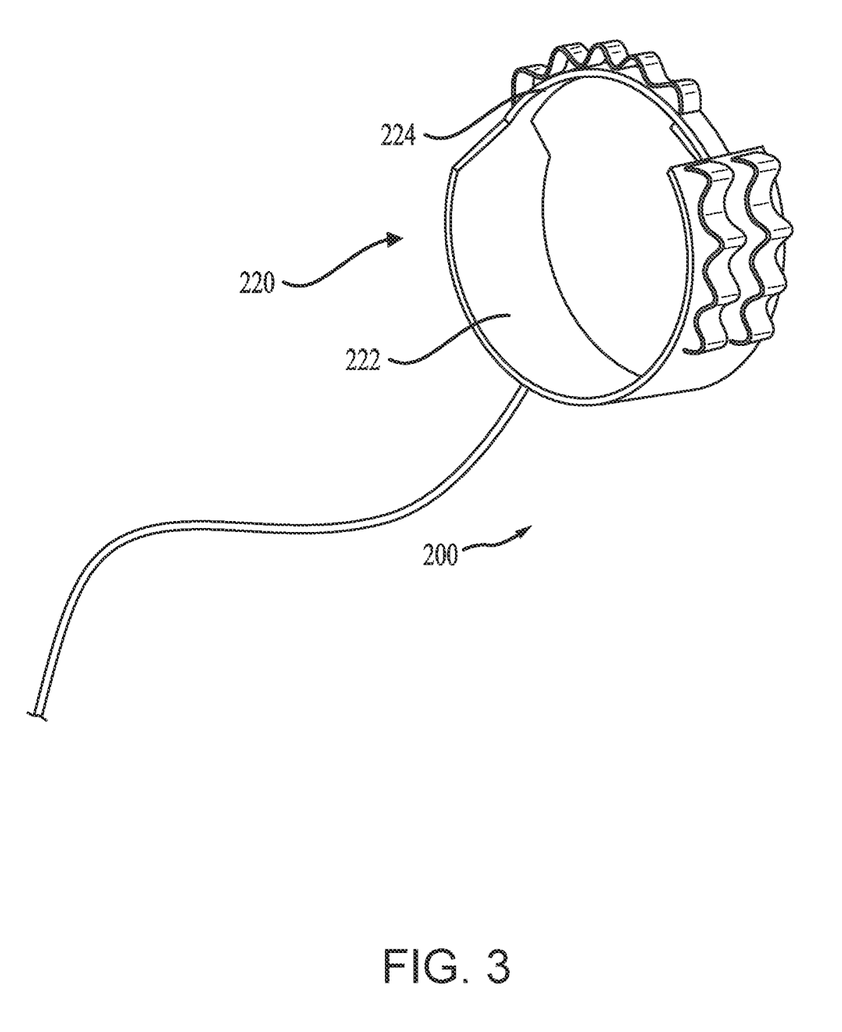
FIG. 3 illustrates a portion of a bicep and/or wrist retention system, in accordance with various embodiments.

Referring now to FIG. 3, a detailed view of a portion of the bicep and/or wrist retention system 200 is illustrated in accordance with various embodiments. The cuff assembly 220 may comprise a cuff 222 and a size adjuster 224. The size adjuster 224 may include a hook and loop fastener attachment mechanism, a belt and buckle attachment mechanism, a press fit connection or the like. In various embodiments, the size adjuster 224 comprises webbing loops configured to secure the cuff 222 to an arm of an occupant 16 from FIG. 2. Although illustrated as comprising a size adjuster 224, the cuff assembly 220 is not limited in this regard. For example, the cuff 222 may comprises a flexible sleeve configured to stretch during a process of coupling the cuff 222 to an arm of an occupant 16 and contract once the flexible sleeve is in place, in accordance with various embodiments.

Figure 4:
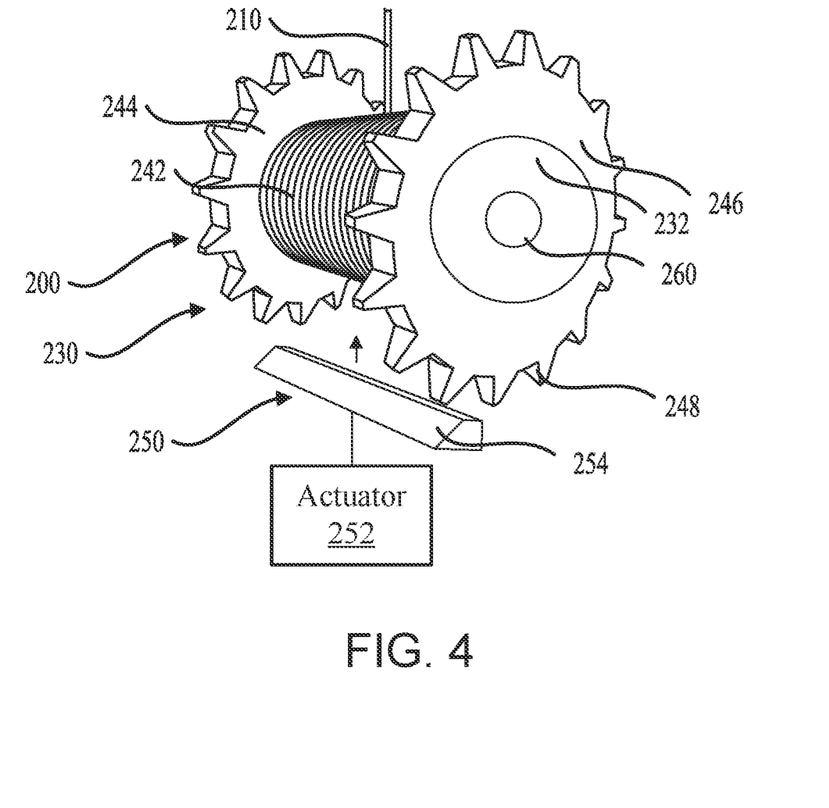
FIG. 4 illustrates a retraction mechanism for a bicep and/or wrist retention system, in accordance with various embodiments.

Referring now to FIG. 4, a retraction mechanism 230 of the bicep and/or wrist retention system 200 is illustrated in accordance with various embodiments. The retraction mechanism comprises a spool 232. The spool 232 comprises a generally cylindrical body 242 extending from a first flange 244 to a second flange 246. In various embodiments at least one of the first flange 244 or the second flange 246 comprises a plurality of teeth 248 extending radially outward from the first flange 244 and/or the second flange 246. The plurality of teeth 248 may be configured to interact with a locking mechanism 250 as described further herein.

In various embodiments, the cord 210 of the bicep and/or wrist retention system 200 is wound around the generally cylindrical body 242 of the spool 232. In various embodiments, the bicep and/or wrist retention system 200 does not include a spring or other mechanism configured to keep the cord taut. In this regard, the bicep and/or wrist retention system 200 is configured to allow uninhibited movement of an arm of an occupant 16 during operation of the aircraft 12 from FIG. 1.

In various embodiments, the retraction mechanism 230 of the bicep and/or wrist retention system 200 further comprises a locking mechanism 250. The locking mechanism 250 may comprise an actuator 252 or the like configured to actuate a locking component 254 configured to engage the plurality of teeth 248 in response to an ejection event as described further herein. In this regard, the actuator 252 may be activated electronically (e.g., electrically or wirelessly) via a sequencer, or ballistically (e.g., via a catapult pressure or the like) as described further herein.

In various embodiments, the retraction mechanism 230 further comprises a motor 260. The motor 260 is operably coupled to the spool 232. In this regard, during an ejection event, the motor 260 may be commanded to retract the cord 210 to a predetermined position (i.e., proximate the seat back). In various embodiments, upon reaching the predetermined position from the retraction, the actuator 252 of the locking mechanism 250 may be commanded to engage a groove defined between adjacent teeth in the plurality of teeth 248. In this regard, the retraction mechanism 230 is configured to retract the cuff assembly 220 from FIGS. 2 and 3 and restrain the cuff assembly 220 in response to an ejection event, in accordance with various embodiments. Although described herein with respect to a motor 260 driving the retraction of cord 210, the present disclosure is not limited in this regard. For example, various retraction mechanisms are within the scope of this disclosure, such as spring mechanisms or the like. In various embodiments, the retraction mechanism 230 comprises an inertia reel.

Figure 5:
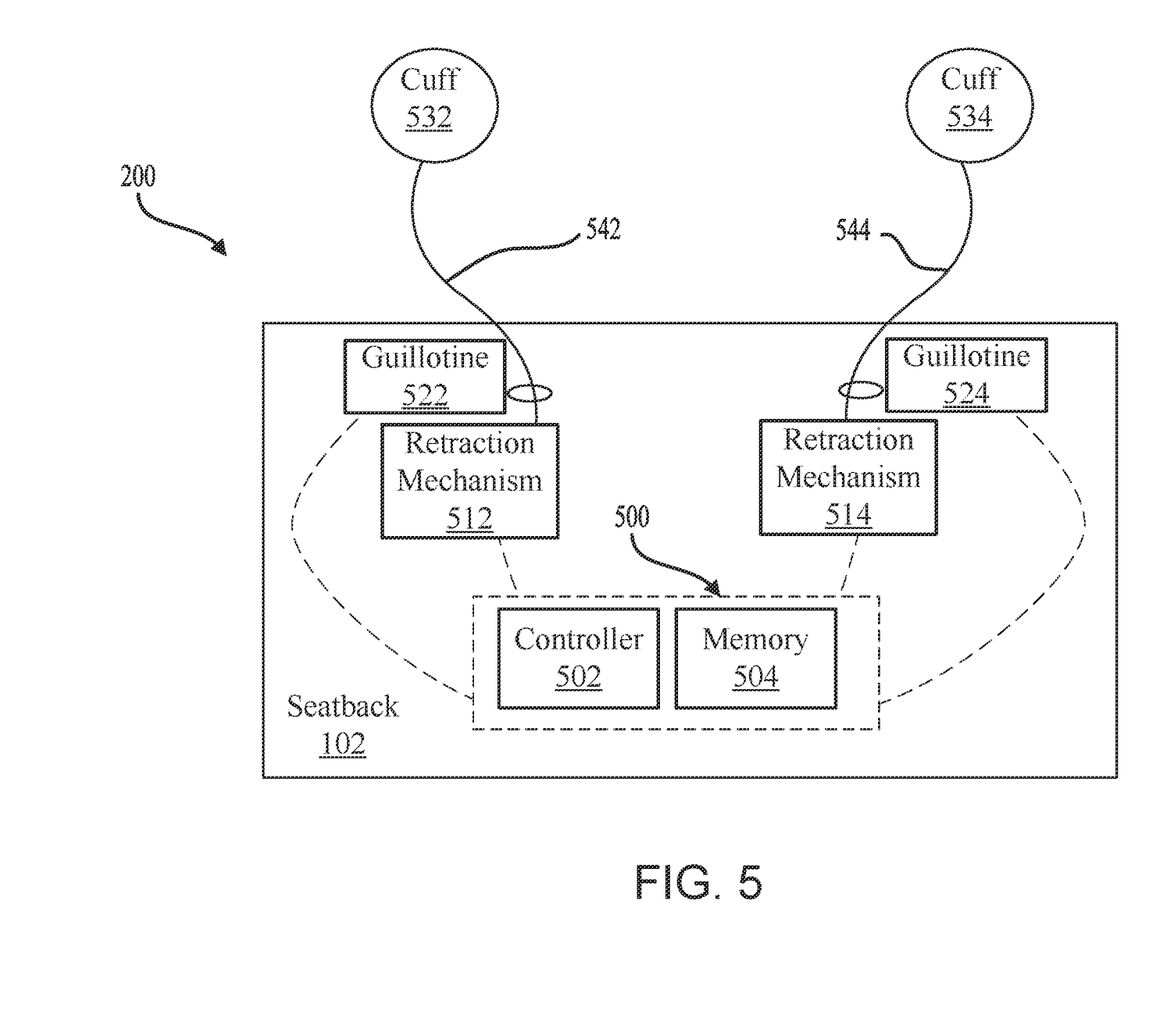
FIG. 5 illustrates a schematic view of a bicep and/or wrist retention system, in accordance with various embodiments.

Referring now to FIG. 5, a schematic view of a control system 500 for the bicep and/or wrist retention system 200 is illustrated, in accordance with various embodiments. In various embodiments, the control system 500 comprises a controller 502 and a memory 504. In various embodiments, controller 502 may be integrated into computer systems of ejection seat 14. In various embodiments, controller 502 may be configured as a central network element or hub to access various systems and components of control system 500. In various embodiments, controller 502 may comprise a processor. In various embodiments, controller 502 may be implemented in a single processor. In various embodiments, controller 502 may be implemented as and may include one or more processors and/or one or more tangible, non-transitory memories (e.g., memory 504) and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 502 may comprise a processor configured to implement various logical operations in response to execution of instructions, for example, instructions stored on a non-transitory, tangible, computer-readable medium configured to communicate with controller 502.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 502 is in electronic communication (e.g., wirelessly or electrically) with a first retraction mechanism 512, a first guillotine 522, a second retraction mechanism 514, and a second guillotine 524. In various embodiments, the retraction mechanisms 512, 514 are in accordance with the retraction mechanism 230 of FIG. 4. In various embodiments, the guillotines 522, 524 are configured to sever a respective cord 542, 544 of a respective bicep and/or wrist retention system 200 in response to receiving a control signal from controller 502 in accordance with various embodiments. The guillotines may include an electrically activated actuator configured to release a cutting component and sever the respective cord 542, 544 as described further herein. Although illustrated as including cord 542 extending from a retraction mechanism 512 and cord 544 extending from a retraction mechanism 514, the present disclosure is not limited in this regard. For example, a single cord may extend from a single retraction mechanism and then split into cord 542 and 544, in accordance with various embodiments. In this regard, only a single guillotine could be utilized as well, in accordance with various embodiments.

In various embodiments, the guillotines 522, 524 and the retraction mechanisms 512, 514 are disposed in the seat back 102. In this regard, the guillotines 522, 524 and the retraction mechanisms 512, 514 may be hidden from view, in accordance with various embodiments.

In various embodiments, the controller 502 and the memory 504 may be components of an electronic sequencer for ejection system 10 from FIG. 1. For example, an electronic sequencer of an ejection system 10 is configured to initiate a sequence of events in response to an ejection handle being pulled (i.e., an ejection event being initiated). An electronic sequencer may initiate deployment of a drogue gun, a parachute, a stabilization firing system, etc., in accordance with various embodiments.

Figure 6:
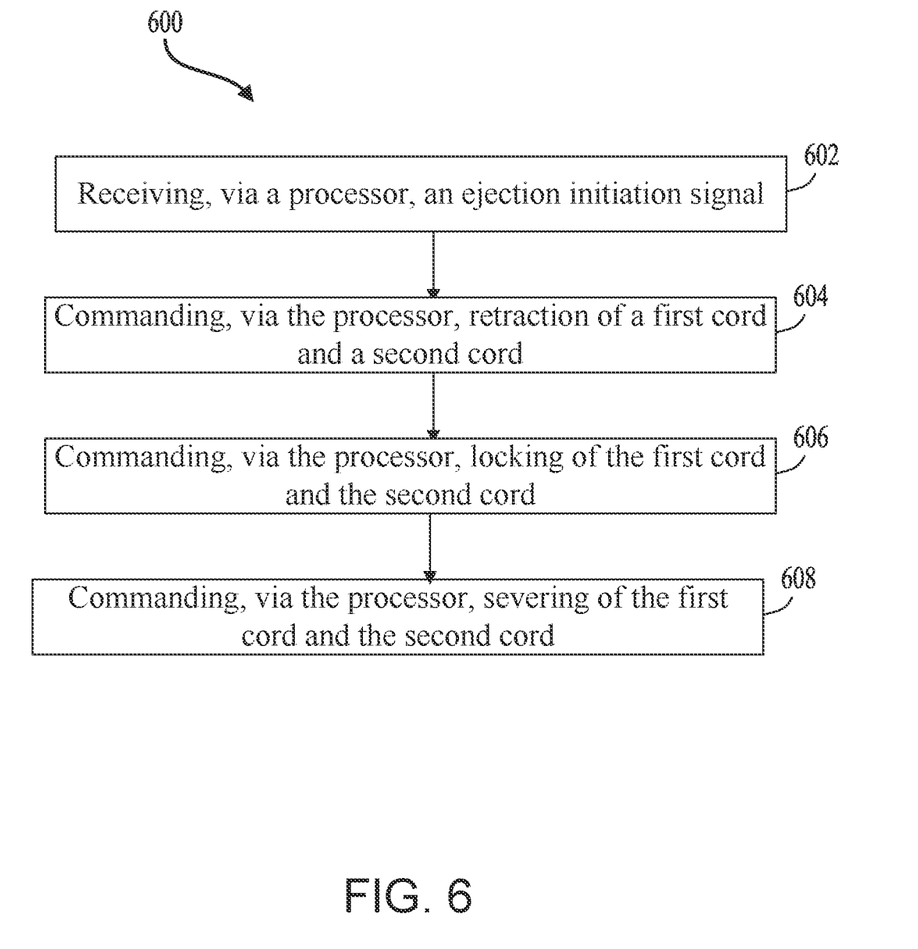
FIG. 6 illustrates a control process for a control system of a bicep and/or wrist retention system, in accordance with various embodiments.

Referring now to FIG. 6, a process 600 flow chart for the controller 502 from FIG. 5 during an ejection event is illustrated, in accordance with various embodiments. The process 600 comprises, receiving, via a processor, an ejection initiation signal (step 602). The ejection initiation signal may be received in response to an occupant (e.g., occupant 16 from FIG. 1) pulling an ejection handle or the like.

The process 600 further comprises commanding, via the processor, retraction of a first cord 542 and a second cord 544 (step 604). The cords 542, 544 are in accordance with the cord 210 from FIGS. 2 and 3. In various embodiments, the first cord 542 may be retracted via a first retraction mechanism 512 and the second cord 544 may be retracted via second retraction mechanism 514. In various embodiments, the first cord 542 and the second cord 544 may be retracted via a single retraction mechanism. The present disclosure is not limited in this regard. In various embodiments, by retracting the cords 542, 544 towards the seat back 102 from FIG. 2, arms of an occupant 16 may be better secured, preventing flailing of arms during the ejection event, in accordance with various embodiments. In various embodiments, the cords 542, 544 may retract the respective cuffs 532, 534 to between flush with the seat back 102 and a foot (30.5 cm) from the seat back, or between flush with the seat back 102 and 6 inches (15 cm) from the seat back.

The process 600 further comprises commanding, via the processor, locking of the first cord 542 and the second cord 544 (step 606). In various embodiments, first cord 542 is locked by a first locking mechanism (e.g., a locking mechanism 250) and the second cord 544 is locked by a second locking mechanism (e.g., a locking mechanism 250). In various embodiments, the first cord 542 and the second cord 544 may be locked by a single locking mechanism. The present disclosure is not limited in this regard.

The process 600 further comprises commanding, via the processor, severing of the first cord 542 and the second cord 544 (step 608). In various embodiments, the cords 542, 544 may be commanded to be severed in accordance with step 608 based on an event in the ejection process. For example, the severing step 608 may occur simultaneously with a parachute being deployed, or a drogue chute being deployed, or the like. In this regard, when the occupant 16 from FIG. 1 may start using his or her arms, the severing step 608 may be performed just prior, in accordance with various embodiments.

Figure 7:
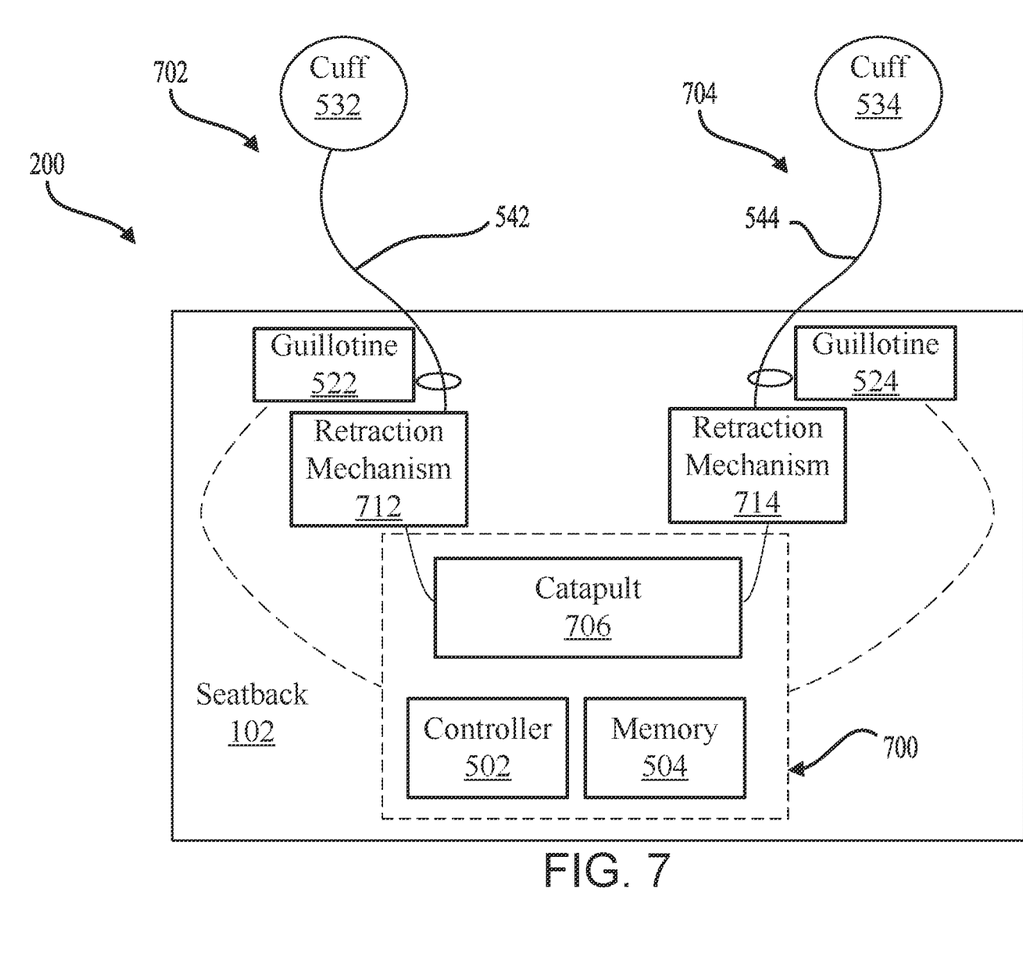
FIG. 7 illustrates a schematic view of a bicep and/or wrist retention system, in accordance with various embodiments.

Referring now to FIG. 7, a control system 700 for a bicep and/or wrist retention system 200 is illustrated, in accordance with various embodiments. The control system 700 may comprise the controller 502 and the memory 504 as disclosed previously herein, and the control system 700 may further comprise a catapult 706. The catapult 706 may include a propulsion system configured to eject the occupant 16 from an aircraft 12 as illustrated in FIG. 1. In various embodiments, pressure generated from the catapult 706 may be utilized to operate the retraction mechanisms 712, 714 of the respective bicep and/or wrist retention devices 702, 704. For example, pressure generated from the catapult 706 may be utilized to wind up the spool of the retraction mechanism 230 and lock the retraction mechanism 230 in place, in accordance with various embodiments. In various embodiments, with the catapult automatically performing the retraction and locking function of process 600, steps 604 and 606 by the controller 502 may be eliminated, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retention system for an aircraft ejection system, the retention system comprising:
   a catapult configured to eject an ejection seat from an aircraft;
   a first cuff assembly disposed on a first side of the ejection seat;
   a second cuff assembly disposed on a second side of the ejection seat;
   a first cord extending from within the ejection seat to the first cuff assembly; and
   a second cord extending from within the ejection seat to the second cuff assembly, the retention system configured to allow a free range of motion of the first cuff assembly and the second cuff assembly during an aircraft flight, the retention system configured to retract and lock the first cuff assembly and the second cuff assembly in response to a seat ejection being initiated, wherein a pressure from the catapult is configured to retract the first cord and the second cord.

2. The retention system of claim 1, further comprising a first retraction mechanism operably coupled to the first cord and a second retraction mechanism operably coupled to the second cord.

3. The retention system of claim 2, wherein the first retraction mechanism and the second retraction mechanism each comprise a spool, the first cord wound around the spool of the first retraction mechanism, the second cord wound around the spool of the second retraction mechanism.

4. The retention system of claim 3, wherein the first retraction mechanism and the second retraction mechanism are each without a spring.

5. The retention system of claim 1, further comprising a retraction mechanism disposed in a seat back of the ejection seat, the retraction mechanism configured to retract the first cord.

6. The retention system of claim 1, further comprising a first guillotine and a second guillotine, the first guillotine configured to sever the first cord during a seat ejection process, the second guillotine configured to sever the second cord during the seat ejection process.

7. The retention system of claim 1, wherein the first cuff assembly and the second cuff assembly each comprise a cuff and a size adjuster.

8. A retention system for an aircraft ejection system, comprising:
   a catapult configured to eject an ejection seat from an aircraft;
   a cuff assembly;
   a retraction mechanism;
   a cord extending from the retraction mechanism to the cuff assembly, wherein a pressure from the catapult is configured to retract the cord via the retraction mechanism;
   a guillotine configured to sever the cord; and
   a controller in operable communication with the guillotine, the controller configured to:
      receive, via a processor, an ejection initiation signal indicating an ejection event of the ejection seat has been initiated; and
      command, via the processor, severing of the cord after ejection of the ejection seat.

9. The retention system of claim 8, further comprising a second cuff assembly coupled to the cord.

10. A method, comprising:
   receiving, via a processor, an ejection initiation signal indicating an ejection event for an ejection seat of an aircraft has been initiated;
   commanding, via the processor, ejection of the ejection seat via a catapult in response to the ejection initiation signal, wherein a pressure from the catapult is configured to retract a cuff assembly via a retraction mechanism; and
   commanding, via the processor, a guillotine to sever a cord coupled to the cuff assembly.

11. The method of claim 10, wherein the guillotine severs the cord after the ejection seat is ejected from the aircraft.

12. The method of claim 10, wherein the pressure is configured to retract a second cuff assembly via a second retraction mechanism towards a seat back of the ejection seat simultaneously with the cuff assembly.

13. The method of claim 10, wherein the cuff assembly is coupled to a bicep and/or wrist of an occupant.

\* \* \* \* \*